Figure 1:
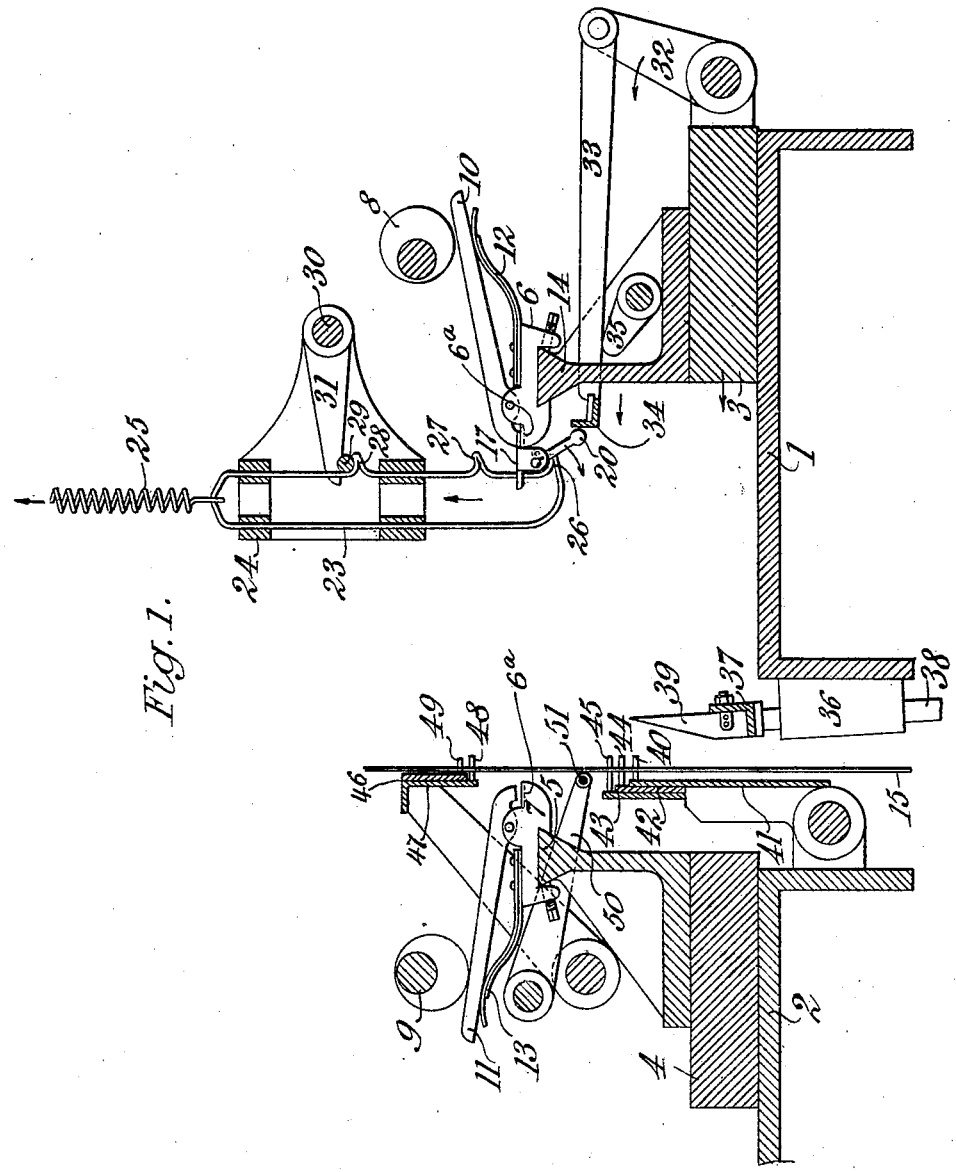

No. 763,250. PATENTED JUNE 21, 1904.
F. BOYER & G. BAUM.
LOOM FOR THE MANUFACTURE OF ORIENTAL CARPETS.
APPLICATION FILED OCT. 27, 1902.
NO MODEL. 11 SHEETS—SHEET 1.

No. 763,250. PATENTED JUNE 21, 1904.
F. BOYER & G. BAUM.
LOOM FOR THE MANUFACTURE OF ORIENTAL CARPETS.
APPLICATION FILED OCT. 27, 1902.
NO MODEL. 11 SHEETS—SHEET 2.

WITNESSES: INVENTORS:
Fred White Georg Baum and Fernand Boyer,
Thomas Wallace By their Attorneys
Arthur C. Fraser & Co.

No. 763,250. PATENTED JUNE 21, 1904.
F. BOYER & G. BAUM.
LOOM FOR THE MANUFACTURE OF ORIENTAL CARPETS.
APPLICATION FILED OCT. 27, 1902.
NO MODEL. 11 SHEETS—SHEET 3.

WITNESSES:
Fred White
Thomas Wallace

INVENTORS:
Georg Baum and Fernand Boyer,
By their Attorneys:

No. 763,250. PATENTED JUNE 21, 1904.
F. BOYER & G. BAUM.
LOOM FOR THE MANUFACTURE OF ORIENTAL CARPETS.
APPLICATION FILED OCT. 27, 1902.

NO MODEL. 11 SHEETS—SHEET 4.

WITNESSES: INVENTORS:

No. 763,250. PATENTED JUNE 21, 1904.
F. BOYER & G. BAUM.
LOOM FOR THE MANUFACTURE OF ORIENTAL CARPETS.
APPLICATION FILED OCT. 27, 1902.
NO MODEL. 11 SHEETS—SHEET 5.
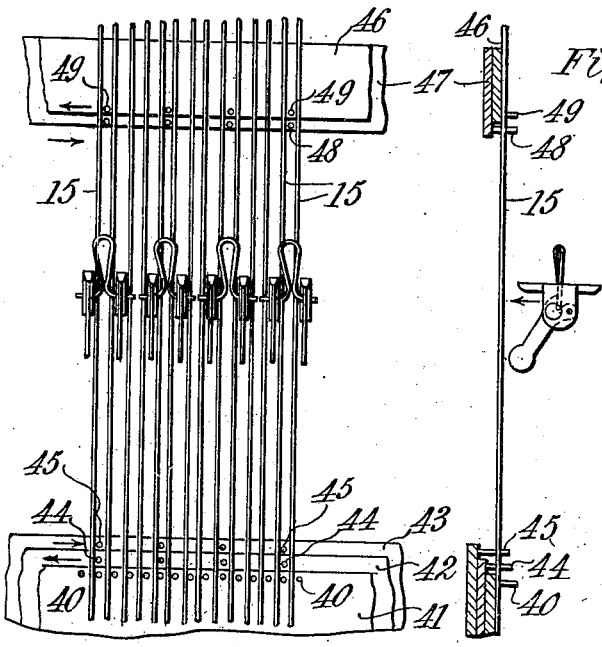
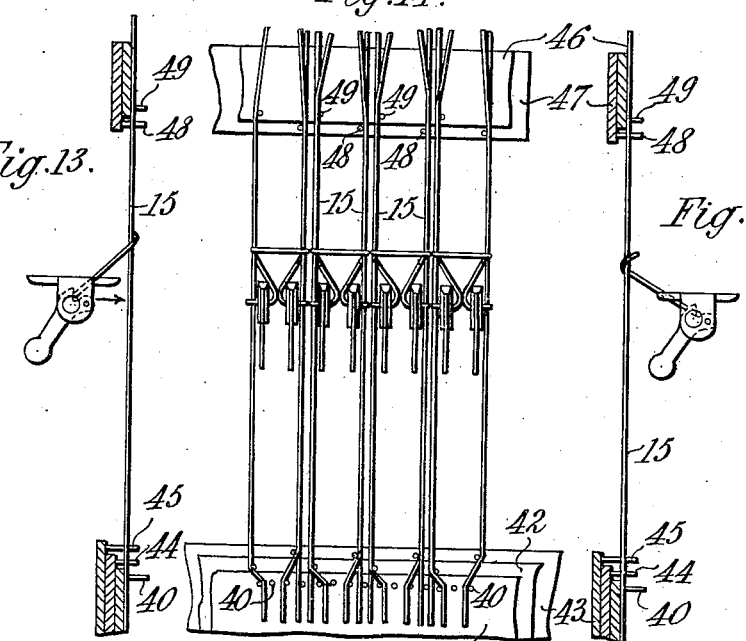

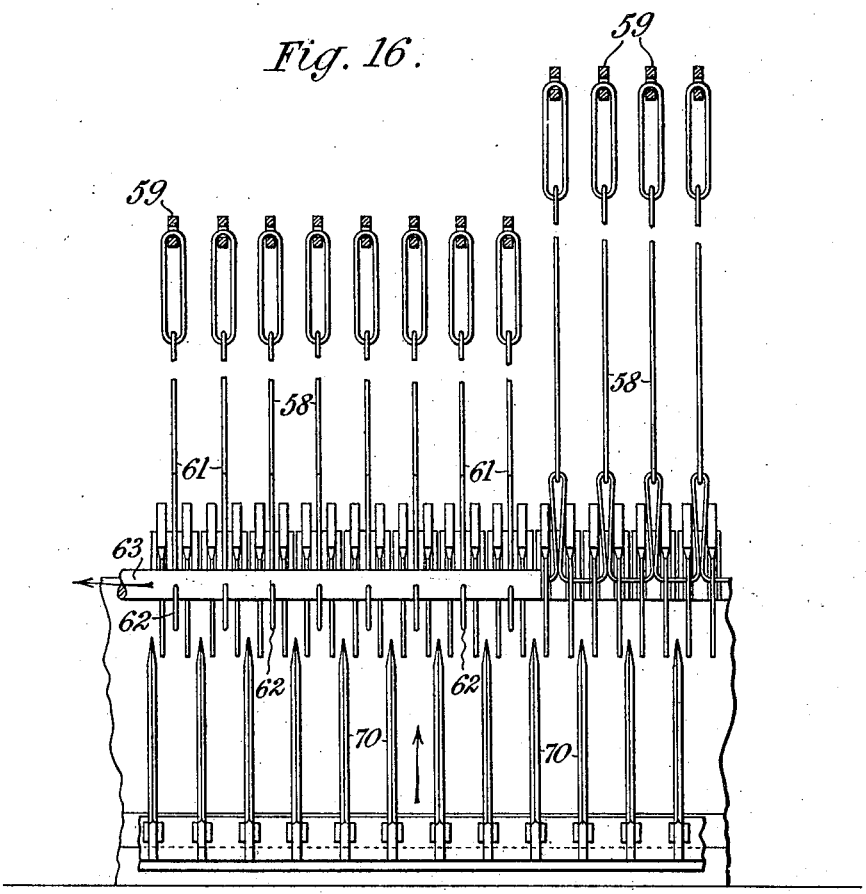

No. 763,250. PATENTED JUNE 21, 1904.
F. BOYER & G. BAUM.
LOOM FOR THE MANUFACTURE OF ORIENTAL CARPETS.
APPLICATION FILED OCT. 27, 1902.
NO MODEL. 11 SHEETS—SHEET 7.

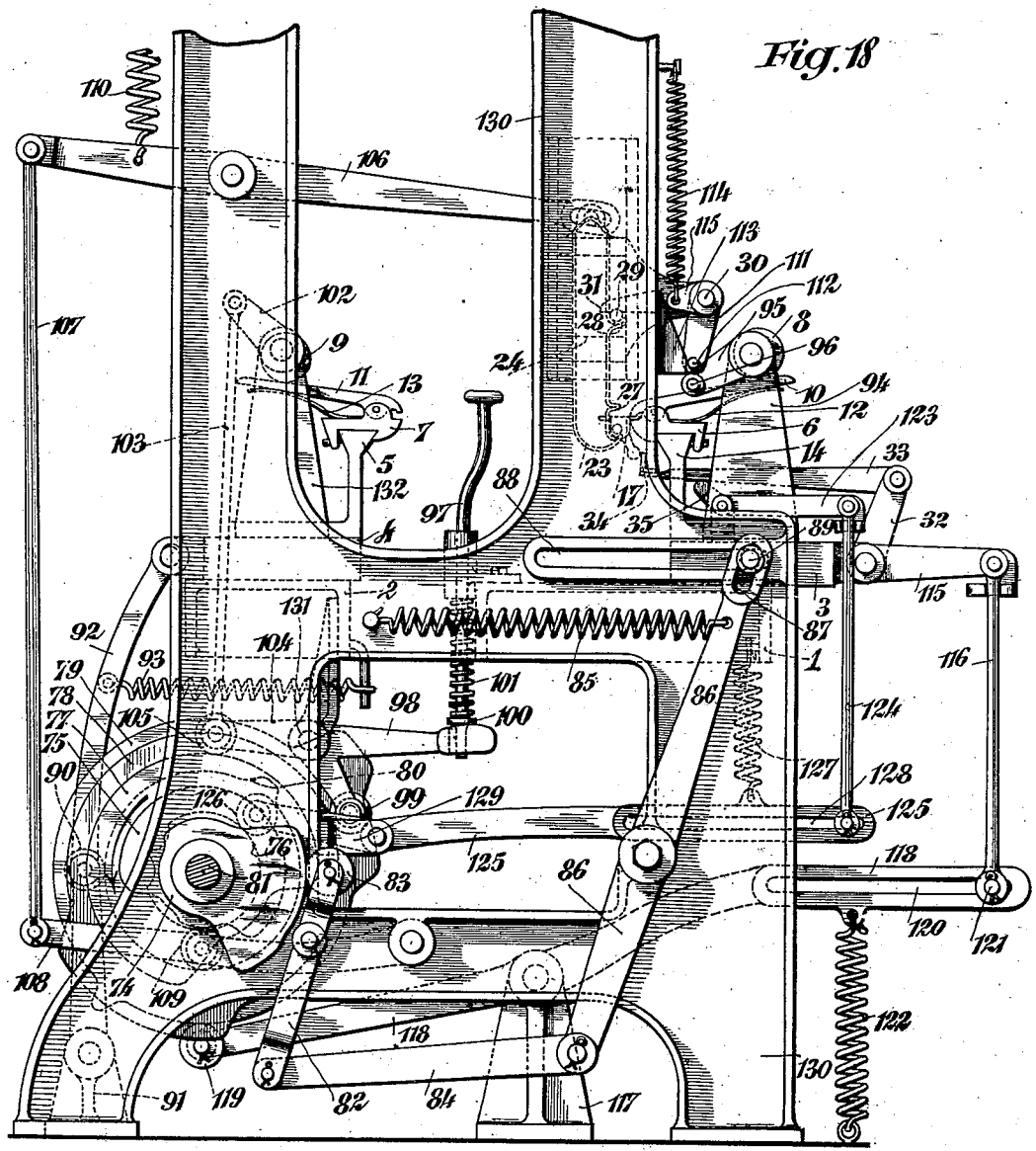

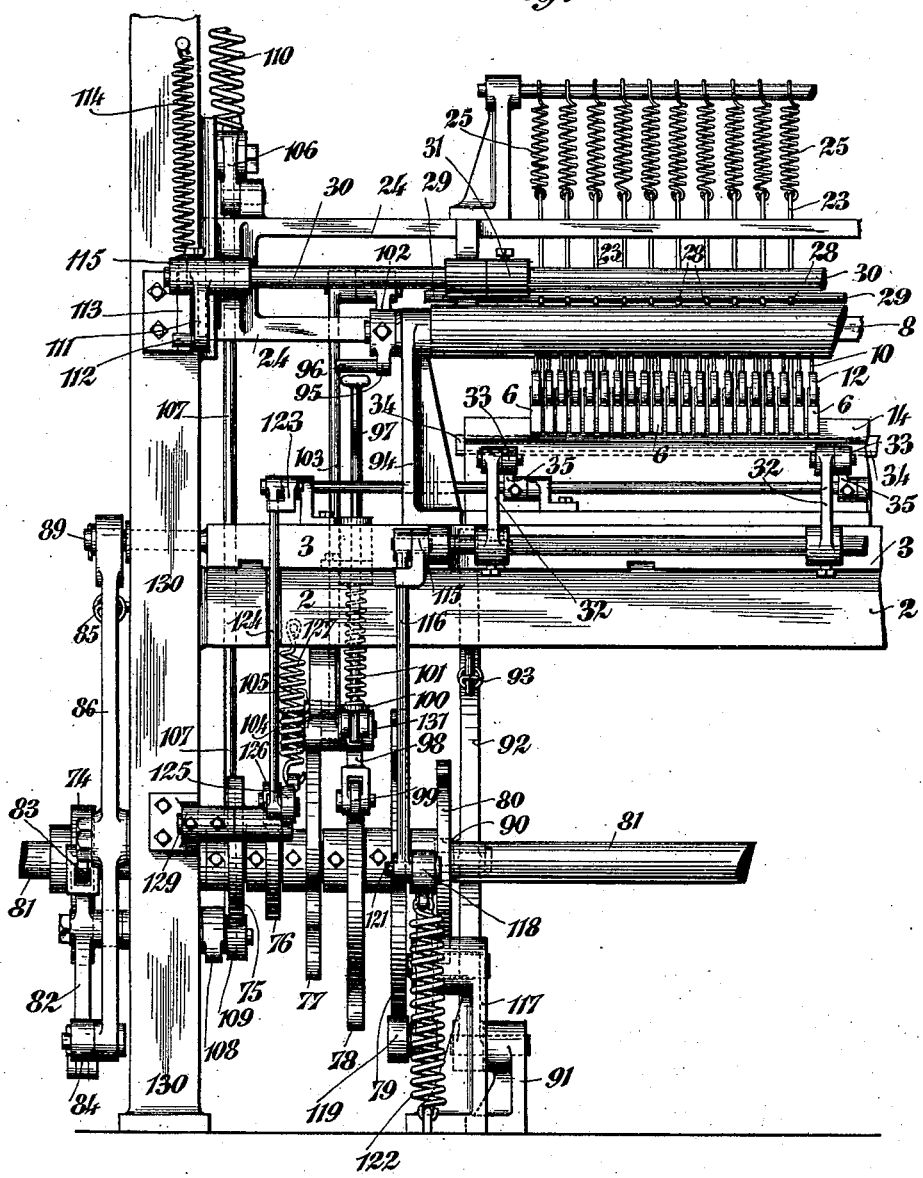

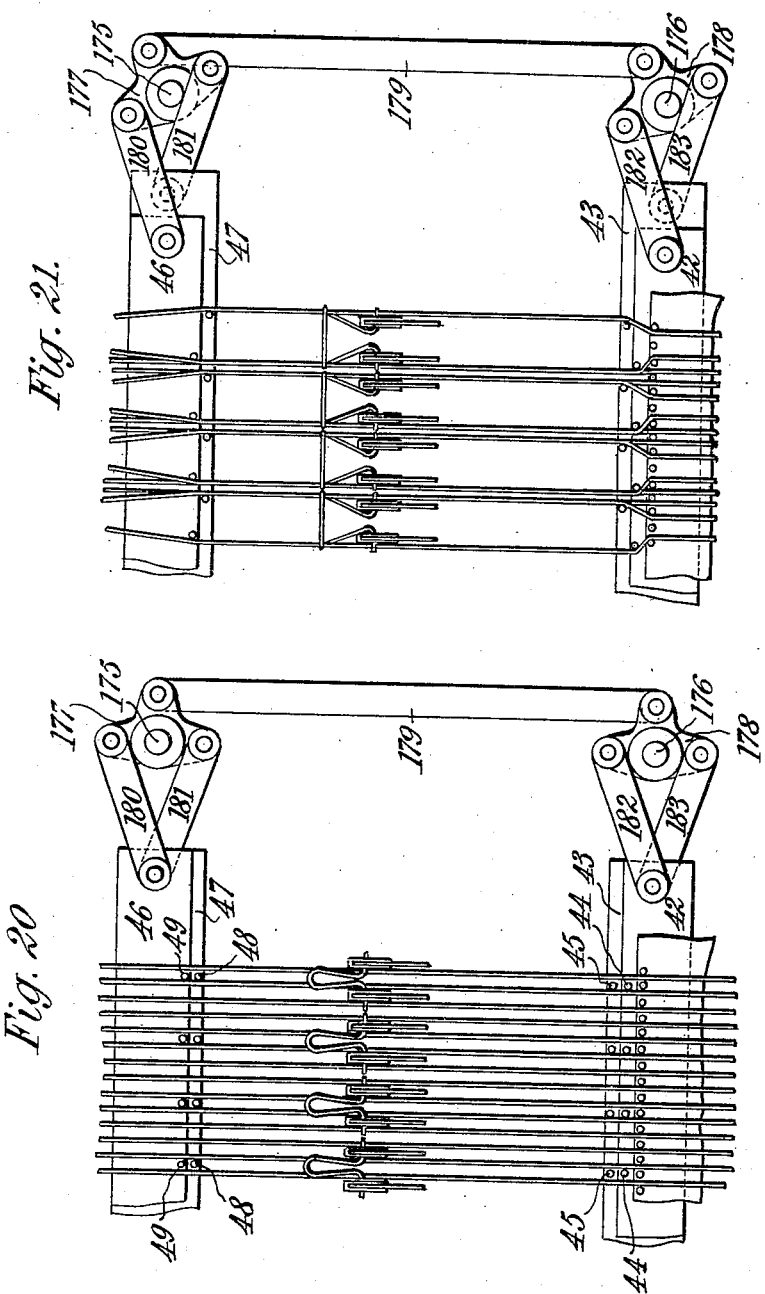

No. 763,250. PATENTED JUNE 21, 1904.
F. BOYER & G. BAUM.
LOOM FOR THE MANUFACTURE OF ORIENTAL CARPETS.
APPLICATION FILED OCT. 27, 1902.
NO MODEL. 11 SHEETS—SHEET 11.

WITNESSES:
Fred White
René Muine

INVENTORS:
Georg Baum and Fernand Boyer,
By their Attorneys
Arthur C. Fraser & Co No. 763,250.

Patented June 21, 1904.

UNITED STATES PATENT OFFICE.

FERNAND BOYER, OF PARIS, FRANCE, AND GEORG BAUM, OF RORSCHACH, SWITZERLAND.

LOOM FOR THE MANUFACTURE OF ORIENTAL CARPETS.

SPECIFICATION forming part of Letters Patent No. 763,250, dated June 21, 1904.

Application filed October 27, 1902. Serial No. 128,999. (No model.)

*To all whom it may concern:*

Be it known that we, FERNAND BOYER, a citizen of the Republic of France, residing at Paris, France, and GEORG BAUM, a citizen of the Republic of Switzerland, residing at Rorschach, Switzerland, have invented certain new and useful Improvements in Looms for the Manufacture of Oriental Carpets, of which the following is a specification.

This invention relates to a loom designed for the manufacture of oriental carpets. The said loom comprises a row of needles which serve in pairs to seize the ends of a loop of thread. In front and behind the warp of the carpet is arranged at each side a row of nippers adapted to approach the warp and recede therefrom in order to cause the needles to alternately pass from one side to the other of the warp. This operation is effected in the following manner: When one row of nippers gives up the needles to the other row, the needles pass, with the ends of the threads which they hold, to the outside of a pair of warp-threads, and the two warp-threads are surrounded by a loop. On the return of the needles the latter pass between the two warp-threads surrounded by the loop in order to form the knot.

In the accompanying drawings the various devices are represented which constitute our improved loom.

Figure 2:
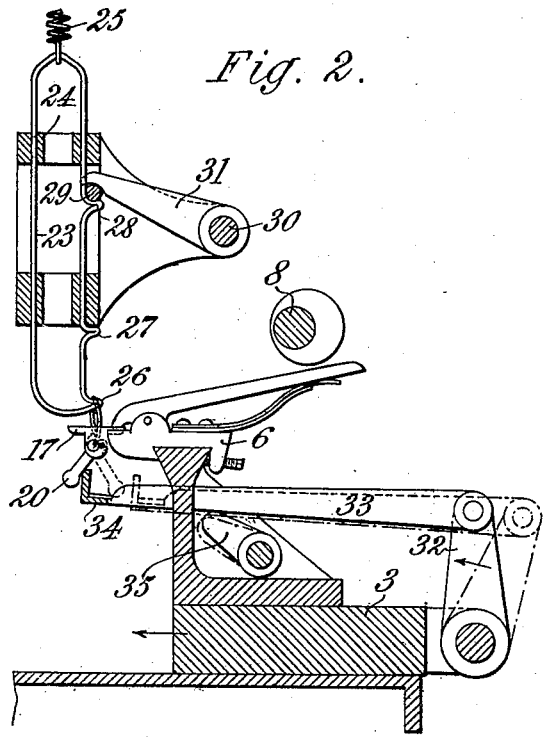
Figure 3:
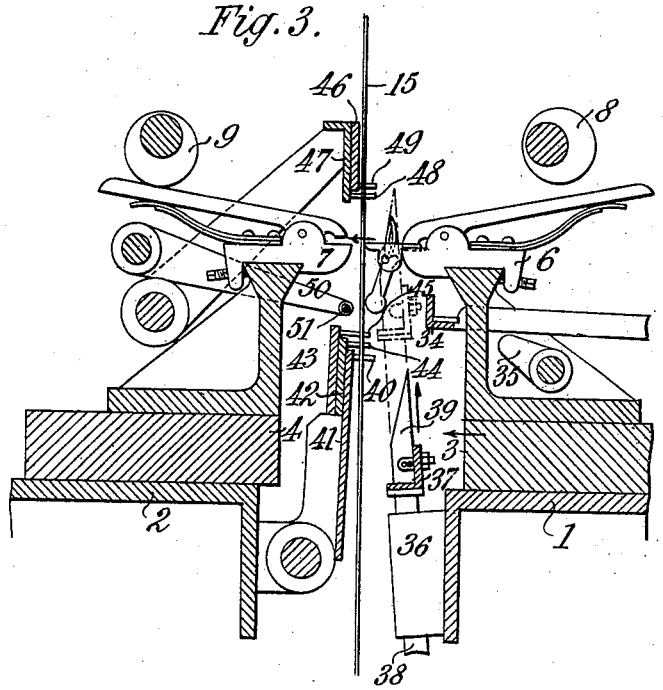
Figure 4:
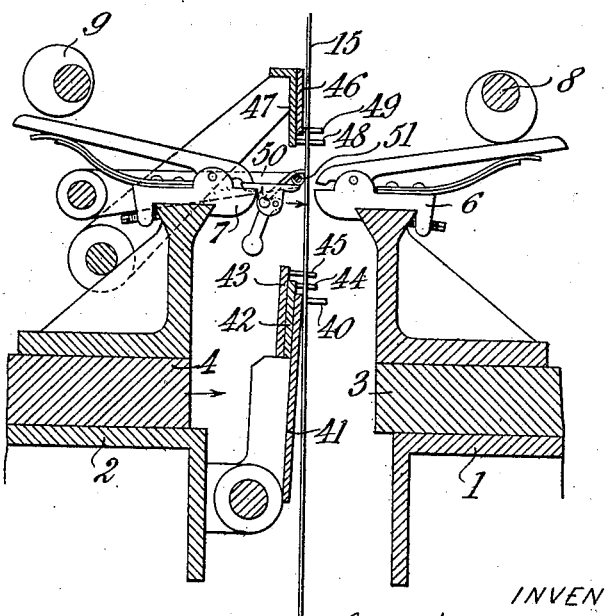
Figure 5:
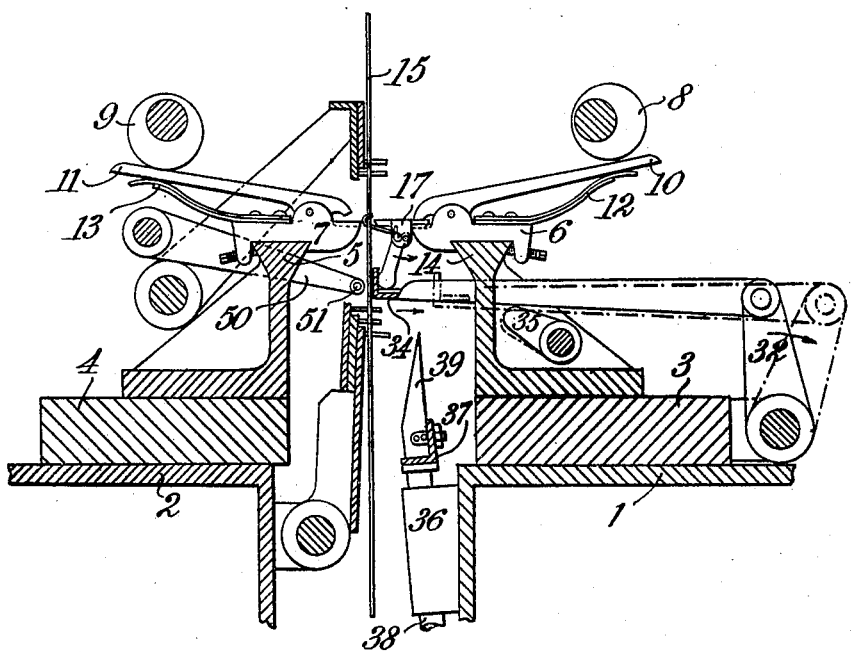
Figure 17:
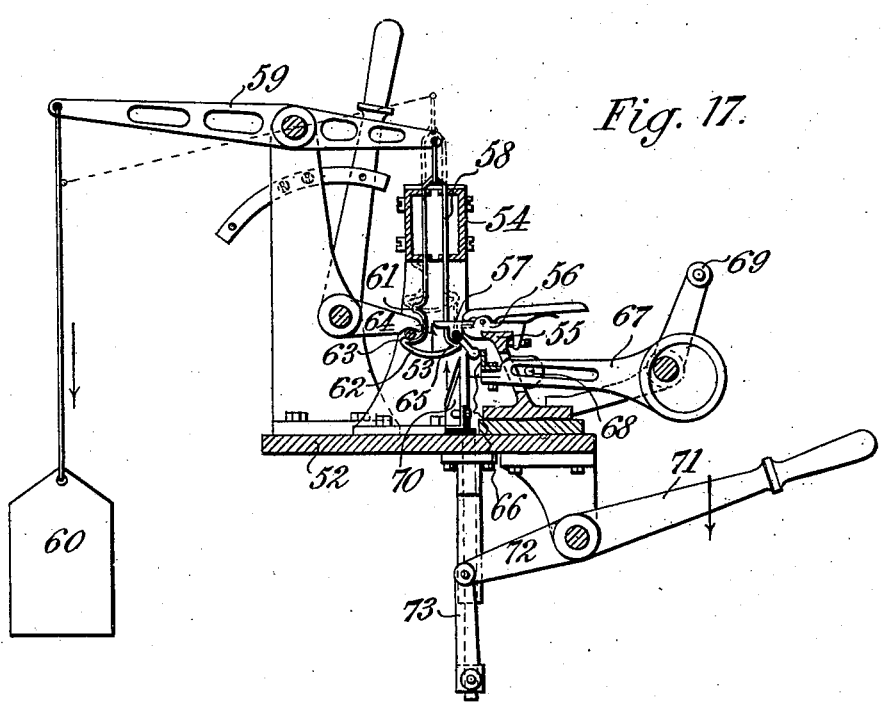
Figure 22:
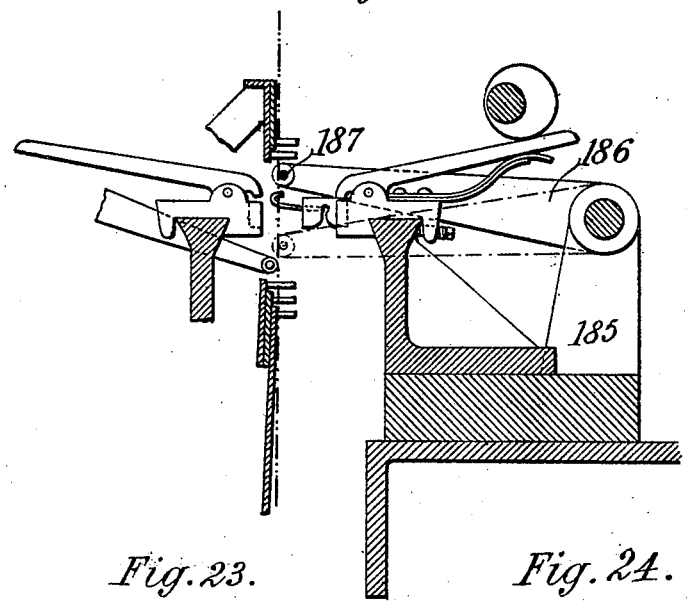
Figure 23:
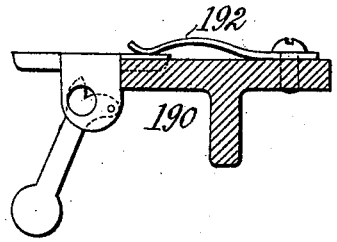
Figure 24:
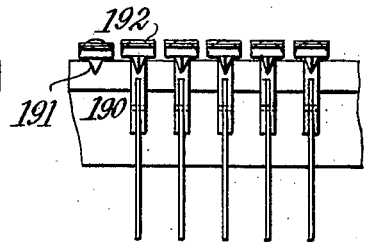
Figure 25:
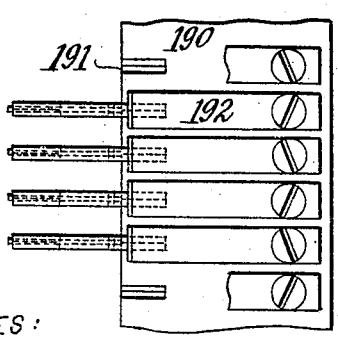

Figure 1 is an elevation, in part sectional, illustrating the principal details of the loom, the thread having been introduced into the needles. Fig. 2 shows in similar view the position of the different parts after the formation of the loop. Fig. 3 illustrates the parts in position for the cutting of the thread. Fig. 4 represents the parts after the passage of the threads through the spaces between the warps. Fig. 5 represents the same parts after the return of the needles. Figs. 6 to 10 represent various modifications of the needle. Figs. 11 to 15 show the parts in different positions. Fig. 16 is a partial rear view. Fig. 17 is a side view of a special apparatus for introducing the thread into the needles and for forming the loops. Fig. 18 is a side view, and Fig. 19 a front view, of the principal parts of the complete loom, showing the mechanism for obtaining the several motions. Figs. 20 and 21 are front views of the means for giving transverse movement to the warp-threads. Fig. 22 is a view similar to Fig. 5, illustrating the method of liberating the threads when using the style of needle shown in Fig. 10. Figs. 23, 24, and 25 are respectively a transverse section, a front elevation, and a plan of a carrying-bar for transferring needles from the threading-machine to the loom or in the opposite direction.

1 is the front table, and 2 the rear table, of the machine, each of which serves to support a carriage 3 and 4, respectively, the said carriages being adapted to be moved toward or to recede from one another. A warp-thread 15 is stretched vertically by the shafts, as in ordinary weaving-looms, between the front and rear tables.

On the carriages 3 and 4 are fixed supports 14 and 5, respectively, upon each of which supports rests a row of nippers 6 7, which coincide with alternate spaces between the warp-threads and serve to grip the needles 17, supporting the loop-thread. To this end the lower jaw of the said nippers is provided with a groove $6^a$, Fig. 1, in which engages a horizontal arm on the needle. Above the tails or levers 10 11 of the nippers are placed cams or eccentrics 8 9, which allow the nippers to open, while springs 12 13 serve to close them. The needles carrying the thread can be of different shapes.

Figure 6:
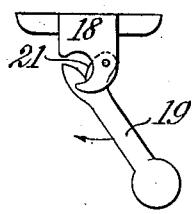
Figures 7, 8, 9:
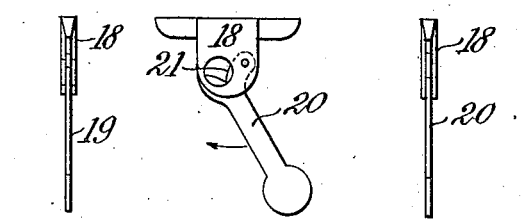

Figs. 6 and 7 show a needle having an open eye, and Figs. 8 and 9 a needle having a closed eye. These two types of needles comprise a pair of cheeks or plates 18, in which is pivoted a thread-gripper 19 or 20, provided at its upper part with a recess 21, which serves to grip and consequently keep the thread in the eye of the needle when the gripper is moved in the direction of the arrow.

Figure 10:
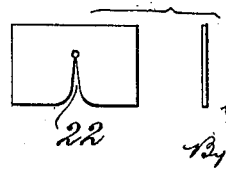

Fig. 10 illustrates a modification of the needle, which consists of a plate provided with a slit or recess 22, in which the thread can be engaged and held. The nippers which seize these needles must, as will be well understood, be suitably formed.

The parts which serve to form the thread-loop consist of a hook 23, which slides in a guide 24 and which is drawn upward by a spring 25. Each of these hooks comprises three noses 26, 27, and 28, the lowermost of which, 26, serves to draw the loop. The one situated above, 27, forms a stop which comes against the guide 24 for limiting the upward movement of the loop and also its length at the same time. The uppermost nose 28 is designed to be acted upon by a bar 29. The hooks are distributed so as to each pass with the nose 26 between two needles of a pair, while between the groups of two needles there is no hook.

The guide 24 can be moved upward, so as to allow of regulating the length of the loops and lowering all the hooks. On the said guide are mounted levers 31, turning upon a common shaft 30 and which press upon the bar 29, resting on the noses 28, and by turning cause all the hooks to be simultaneously lowered. Two cranks or swinging arms 32 are mounted upon the carriage 3. At the end of each of them is jointed a connecting-rod 33. The two rods 33 are connected together by a bar 34, which can be moved toward the tails of the thread-grippers 20 of the needles and limit the turning movement of the said grippers. To this end the bar 34 must be capable of being raised and lowered, and fingers 35 are therefore provided, mounted on a common shaft located beneath the rods 33.

At the front part of the table 1 are two guides 36, in which slide rods 38, connected together by an angle-bar 37. This angle-bar carries knives 39, which are designed to engage in the spaces between the alternate pairs of needles, where there are no loops, in order to cut the threads—that is to say, between the various groups of two warp-threads.

The pins 40, mounted upon the plate 41, hold the warp-threads 15 at equal distances apart from one another. Behind the plate 40 are plates 42 43, also provided with pins 44 55. These plates move transversely in opposite directions to one another. Above the needles are two other plates 46 47, provided with pins 48 49, also moving transversely in opposite directions to one another and which correspond with the plates 42 43.

The mechanism for moving the plates 42, 43, 46, and 47 is illustrated in Figs. 20 and 22. The rock-shaft 175 is driven by any suitable connection from the main shaft of the machine. This shaft and also the shaft 176 carry three-armed levers 177 and 178, which are connected so as to move together by means of a link 179. The three-armed levers 177 and 178 are connected, by means of links 180, 181, 182, and 183, to the plates 46, 47, 42, and 43, so that the plates 46 and 42 move in one direction and the plates 47 and 43 move simultaneously in the opposite direction. When the two opposite arms of the levers 177 and 178 stand at a vertical position, Fig. 18, the threads are all equally spaced. When the shafts are turned to the position of Fig. 21, the plates 46 and 42 are shifted to the left and the plates 47 and 43 to the right, moving the warp-threads to the position shown in Fig. 21.

The loom operates in the following manner: When the carriage 3 is in the position indicated in Fig. 1 and all the thread-grippers have their tails 20 inclined backward, the eyes of the needles which are gripped by the nippers 6 are all open and the thread from a bobbin is passed through all the eyes by means of an ordinary needle; but the hooks 23 are previously lowered by moving the guide 24 and afterward causing the lever 31 to turn, so that the noses 26 of the various hooks come underneath the needles, as shown in Fig. 1. When the thread has been gripped in the eyes of the last needles, the bar 29 is withdrawn longitudinally, releasing the hooks one after another, commencing at the side opposite the last threaded needle, and the springs 25 cause the hooks to rise one after the other until the noses 27 abut against the guides 24. A row of thread-loops of the same length is thus formed. (See Fig. 2.) The angle-bar 34, which occupied the position indicated in Fig. 1, is pushed forward, and the thread is consequently gripped in the eyes of the needles by all the thread-grippers 20, after which the bar 34 moves back. By slightly lowering the hooks and slightly causing the carriage 3 to retreat the loops become disengaged from the noses 26, and each hook is placed in its highest position by the lifting of the guide 24, so that it shall not act in the following operations. At this moment the carriage 3 advances into the position shown in Fig. 3 to allow the knives 39 when they rise to cut the thread between two loops, as illustrated in Fig. 11. The cutters having been lowered, the needles carrying the threads are caused to pass through the warp 15 by continuing to advance the carriage 3, the several successive groups of two needles leaving between them two warp-threads, as shown in Fig. 11. After that the thread-carrying needles are seized by the nippers 7 and released by the nippers 6. Then the carriage 4 moves slightly backward and assumes the position shown in Fig. 4, so that each group of two warp-threads is surrounded by a loop. Behind the warp and below the needles is located a tightly-strained wire 51, supported by a lever 50, which can be pushed back upward, as shown in Fig. 4, in order to also push the loops upward and prevent them falling below the horizontal arms of the needles. When this wire 51 is again lowered, the loops retain their position by virtue of the natural tension of the thread from which they are formed. Then the warp-threads surrounded by each loop are moved apart by shifting in the direction of the arrows, Fig. 11, the plates 42, 43, 46, and 47, carrying the pins, so that the needles corresponding with each group of two warp-threads may pass without difficulty between the latter, Figs. 13 and 14. This operation is effected by causing the carriage 4 to advance, after which the needles are again seized by the nippers 6 and completely drawn between the warp-threads, Fig. 15. The plates 42, 43, 46, and 47 are then moved back into their places, so that the pins 44, 45, 48, and 49 come into position immediately above one another. The highly-strained warp-threads then resume the position shown in Fig. 11 and the loops are knotted as if they were done by hand. The last movement which takes place is the replacement of the tails of the thread-grippers for the purpose of liberating the threads and which takes place in the same manner as the opposite movement which effects the gripping of the latter. The angle-bar 34 advances under the action of the crank 32 and is then lifted by the fingers 35 so as to be brought in front of the tail of the thread-gripper. In coming back the bar 34 replaces the tails of the thread-grippers and liberates the threads. The operations can then be successively repeated until, the row of knots alternating with the weft-threads, the carpet is finished.

When employing the needles represented in Fig. 10, the threads are liberated by employing a wire stretched above the needles and which by lowering the ends of the threads causes them to pass out of the slit or recess 22. The mechanism is shown in Fig. 22. The parts 32, 34, and 35 of Fig. 5 are not necessary with this style of needle. On the support 185 are placed oscillating levers 186, which carry at their ends a wire 187, extending the entire length of the loom. When the knots have been formed and the needles brought back to their original position, the wire 187 is lowered by means of the levers 186 to the position shown in dotted lines and the threads are withdrawn from the needles.

Instead of effecting the threading and the formation of the loops on the machine itself these operations can be effected upon a special apparatus represented in Figs. 16 and 17.

On the plate of the table 52 and the standards 53 is arranged the hook-guide 54 in such a manner as to allow of its being moved vertically. On the bar or support 55 are also mounted nippers 56, which are designed to seize the carrying-needles 57. 58 is one of the hooks which are suspended from one of the ends of the levers 59, the other end of which carries a weight 60, which tends to cause the hooks to rise.

The noses 61 serve as stops to limit the upward movement of the hooks, while the noses 62 serve to carry a bar 63. The levers 64, which are operated by means of a lever-handle, can bear upon this bar in order to lower the noses 65 beneath the eyes of the needles. An angle-bar 66, mounted upon two eccentric levers 67, which are guided by a pin 68, sliding in a slot, is caused to recede and advance by turning the crank-handle 69, and serves to close the eyes of the needles. By means of knives 70, which are mounted upon an angle-bar, the thread can be cut by raising the said knives by a jointed arrangement of levers 72 and 73.

The threading and the drawing of the loop by raising the bar 63 takes place as hereinbefore described, Fig. 16.

The passage of the threaded needles from the nippers of the apparatus to the nippers of the machine is effected by means of carrying-bars.

When exactly similar nipper-carrying bars are provided which can be fitted as well to the apparatus as to the loom, it is also possible to thread the needles on the apparatus and to carry them with the loops onto the machine. A suitable carrying-bar is shown in Figs. 23, 24, and 25. The bar or table 190 is provided with tapered grooves 191 of a shape to fit the bottoms of the needles. Above each groove is a flat spring 192, the strength of which is such that the needle can be easily pushed under the spring and will be held by the spring. Supposing the needles to have been threaded on the threading apparatus, the carrying-bar is pressed against the ends of the needles, so that the latter enter the grooves and are held by the flat springs. Then the needle-pincers 56, Fig. 7, are opened and the removal of the bar carries the needles with it. Similarly, the needles are placed in the loom by placing their free ends in the pincers 6 of the loom, these latter being opened beforehand. Then the pincers 6 are closed and the bar 190 withdrawn, leaving the needles held in the pincers. In a similar way the empty needles can be taken from the pincers 6 of the loom and introduced into the pincers 56 of the threading apparatus.

The various operations described may be accomplished by any suitable mechanism, and various mechanisms for this purpose may be designed by those skilled in the art. The particular style of mechanism which we propose to use is indicated in Figs. 18 and 19. The several motions are obtained chiefly from rotating cams 74, 75, 76, 77, 78, 79, and 80, which are mounted on a shaft 81, carried in the side frames 130 of the machine.

The backward and forward movement of the slide 3 is secured from the cam 74 by means of a pair of double-armed levers 82 and 86, connected by means of a link 84 and mounted on the outer side of the frame 130. The free end of the arm 82 carries a roller 83, bearing against the cam 74, while the free end of the lever 86 is slotted, as at 87, and in this slot lies a pin 89, fastened to the slide 3 and projecting through a horizontal slot 88 in the side frame of the machine. To this same arm of the lever 86 is connected a spring 85, which at its opposite end is connected to a pin on the side frame. This spring maintains the roller 83 suitably pressed against the cam 74. The cam 80 gives the desired movement to the slide 4. For this purpose a lever 92 is linked to the slide 4 at one end, its opposite end being pivoted in a fixed support 91, and a spring 93 acting at an intermediate point to press the slide forward. A roller 90 at an intermediate point of the lever 92 is in the path of the cam 80, so as to transmit the movement of the cam to the slide.

In order to turn the eccentric shaft 8, so as to open the nippers 6, there is keyed on the shaft an arm 95, carrying on its end a pin 96, the shaft 8 being mounted in supports 94 on the slide 3, so that the whole reciprocates with the slide. In the advance position of the slide when the nippers are to be opened the pin 96 stands over a rod 97, mounted in vertical guides, the rod being provided near its lower end with a collar 100, which bears on an arm of an angle-lever 98, mounted on a shaft 131, the other arm of the lever carrying a roller 99, which bears against the cam 78. Between the fixed guide for the rod 97 and the collar 100 there is provided a spring 101, which serves to press the rod 97 against the angle-lever 98 and to hold the latter, with its roller 99, against the cam 78.

The eccentric shaft 9 for operating the movable arm 11 of the opposite nippers 7 is mounted similarly to the eccentric shaft 8 on a support 132, carried on the slide 4 and carries likewise an arm 102. This arm 102 is connected by means of a link 103 with an arm 104, which swings about the shaft 131. On the end of the arm 104 is carried a roller 105, bearing against the cam 77 and held against such cam by the pressure of the springs 13 of the nippers.

The frame 24, in which the hooks 23 are guided, is arranged in vertical guides on the side frames 130 and is suspended from arms of double-armed levers 106, which are pivotally mounted in the opposite side frames. The spring 110 tends to move the frame downward. The rear end of the lever 106 is connected by means of a link 107 with an arm 108, pivotally connected to the side frame and passing beneath the cam 75. On the arm 108 is a roller 109, which by means of the spring 110 is held against the cam 75.

On the end of the shaft 30, mounted on the frame 24, which shaft carries the arm 31, is an arm 111, carrying at its end a pin 112. This pin lies in the plane of a projecting cam 113, fastened to the side frame 130, so that the pin 112 on the lowering of the frame 24 bears on the inclined face of the cam 113 and is turned thereby, so that the lowering of the hooks 23 follows. In order to return the arm 111 and the arms 31 to their normal position, a spring 114 is provided, which is connected at one end to the side frame and at its other end to an arm 115, fastened on the shaft 30.

The crank 32 on the slide 3 and the links 33, carrying the bar 34, receive their movement from the cam 79 through the intermediation of an arm 115, connected to the shaft of the crank 32, and which through a link 116 is connected with a double-armed lever 118, mounted in a support 117, the other arm of this lever carrying a roller 119, which bears on the under side of the cam 79. The arm of the lever which is connected with the link 116 has a longitudinal slot 120, in which the connecting-pin 121 slides during the backward and forward movement of the slide 3. A spring 122 maintains a suitable pressure of the roller 119 against the cam 79.

The arms 35, which lift the links 33 and which are mounted on the slide 3, are operated by the cam 76 through the intermediation of a link 124, connected at its upper end to an arm 123 on the shaft of the arms 35, the link 124 being connected at its lower end to the long arm of a double-armed lever 125, carried in a support 129 and having at its opposite end a roller 126, bearing against the cam 76. A slot 128 is provided in the long arm of the lever 125 as a guide for the connecting-pin 124 in the backward and forward movement of the slide 3. The spring 127 maintains the roller 126 against its cam.

Though we have described with great particularity of detail an apparatus enbodying our invention, yet it is to be understood that the invention is not limited to the specific machine shown. Various modifications in details and in the general arrangement and combination of the parts may be made by those skilled in the art without departure from the principles of the invention.

What we claim is—

1. In a loom for the manufacture of oriental carpets, the combination of a row of needles adapted to operate in pairs and to seize the ends of a loop of thread, two movable rows of nippers one at each side of the warp-threads and adapted to pass the needles from one side to the other of the warp, and to transfer the needles from one row of nippers to the other alternately, and means for shifting the warp-threads to first cause the needles and the ends of the loops which they carry to pass outside of a pair of warp-threads, and to thus surround two warp-threads with a loop upon one movement of the needles, and to cause them to pass between the two warp-threads surrounded by the loop upon the return movement of the needles in order to form a knot.

2. A needle for looms provided with an eye through which the thread may be passed, having means for gripping the thread in such eye.

3. A needle for looms provided with a pair of eyes in line with each other through which the thread may be passed, and provided with a gripper adapted to grip the thread in said eyes.

4. A needle for looms comprising a pair of plates 18 provided with eyes in line with each other through which the thread may be passed, and provided with a gripper pivoted between said plates for gripping the thread in said eyes.

5. A needle for looms provided with a closed eye through which the thread may be passed, and provided with a gripper for gripping the thread in said eye.

6. In a loom for the manufacture of oriental carpets, the combination of a row of needles having thread-grippers provided with tails, and means for operating said tails to grip the thread in the needle and to open the grippers at the proper periods.

7. In a loom for the manufacture of oriental carpets, the combination with a row of needles provided with grippers having tails, of a bar for moving said tails to operate the grippers, means for moving said bar in front of or behind the tails of the grippers, and means for moving said bar horizontally to move the tails in either direction.

8. In a loom for the manufacture of knotted carpets, the combination of a row of needles through eyes of which the thread is adapted to be passed, and means for drawing the thread into loops between the needles.

9. In a loom for the manufacture of knotted carpets, the combination with a row of needles through eyes of which the thread is adapted to be passed, of a series of hooks, and means for passing said hooks one after another through certain spaces between said needles to draw the thread into loops.

10. In a loom for the manufacture of oriental carpets, the combination of a row of needles through eyes of which the thread is adapted to be passed, means for looping the thread between said needles, and means for cutting the thread between each two successive loops.

11. In a loom for the manufacture of oriental carpets, the combination of a row of needles through eyes of which the thread is adapted to be passed, means for drawing the thread into loops in the alternate spaces between said needles, and means for cutting the thread in the spaces between said needles in which there are no loops.

12. In a loom for the manufacture of oriental carpets, the combination of a row of needles through eyes of which the thread is adapted to be passed, means for drawing the thread in loops at certain intervals between said needles, means for then gripping the thread in the needles, and means for cutting the thread between the loops.

13. In a loom for the manufacture of knotted carpets, the combination of a pair of needles adapted to be passed backward and forward through the warp, and warp guide-plates moving in opposite directions and provided with pins engaging the warp-threads for shifting the same so as to maintain the threads of a pair together to permit the pair of needles to pass outside of them, and alternately separated so as to permit the pair of needles to pass between them.

In witness whereof we have hereunto signed our names in the presence of the subscribing witnesses.

FERNAND BOYER.
     GEORG BAUM.

Witnesses as to Fernand Boyer:
 Auguste Mathieu,
 Edward P. MacLean.

Witnesses as to Georg Baum
 Carl Kaufmann,
 Jakob Abderhalden.